United States Patent
Vaswani et al.

[11] Patent Number: 6,052,127
[45] Date of Patent: Apr. 18, 2000

[54] CIRCUIT FOR DETERMINING NON-HOMOGENOUS SECOND ORDER PERSPECTIVE TEXTURE MAPPING COORDINATES USING LINEAR INTERPOLATION

[75] Inventors: Gautam P. Vaswani; Michael K. Larson; Tom A. Dye, all of Austin; Daniel Wilde, Cedar Park, all of Tex.

[73] Assignee: Cirrus Logic, Inc., Fremont, Calif.

[21] Appl. No.: 08/777,556

[22] Filed: Dec. 30, 1996

[51] Int. Cl.$^7$ .................................................. G06F 15/00
[52] U.S. Cl. ............................................................ 345/430
[58] Field of Search ................................... 345/430, 429, 345/428, 427, 419

[56] References Cited

U.S. PATENT DOCUMENTS

| | | | |
|---|---|---|---|
| 4,583,185 | 4/1986 | Heartz et al. | 364/521 |
| 4,586,038 | 4/1986 | Sims | 340/729 |
| 4,692,880 | 9/1987 | Merz et al. | 364/521 |
| 4,714,428 | 12/1987 | Bunker et al. | 434/43 |
| 4,715,005 | 12/1987 | Heartz | 364/521 |
| 4,727,365 | 2/1988 | Bunker et al. | 340/728 |
| 4,811,245 | 3/1989 | Bunker et al. | 364/521 |
| 4,821,212 | 4/1989 | Heartz | 364/521 |
| 4,825,391 | 4/1989 | Merz | 364/526 |
| 4,855,937 | 8/1989 | Heartz | 364/521 |
| 4,862,388 | 8/1989 | Bunker | 364/521 |
| 4,905,164 | 2/1990 | Chandler et al. | 364/518 |
| 4,958,305 | 9/1990 | Piazza | 364/522 |
| 4,965,745 | 10/1990 | Economy et al. | 364/518 |
| 5,126,726 | 6/1992 | Howard et al. | 340/728 |
| 5,187,754 | 2/1993 | Currin et al. | 382/54 |
| 5,191,642 | 3/1993 | Quick et al. | 395/127 |
| 5,268,996 | 12/1993 | Steiner et al. | 395/126 |
| 5,293,467 | 3/1994 | Buchner et al. | 395/122 |
| 5,357,579 | 10/1994 | Buchner et al. | 382/1 |
| 5,367,615 | 11/1994 | Economy et al. | 395/129 |
| 5,420,970 | 5/1995 | Steiner et al. | 395/133 |
| 5,651,106 | 7/1997 | Ashburn | 395/141 |
| 5,680,525 | 10/1997 | Sakai et al. | 395/130 |
| 5,701,405 | 12/1997 | Kelley et al. | 395/141 |

FOREIGN PATENT DOCUMENTS

WO 96/36011  11/1996  WIPO.

*Primary Examiner*—Phu K. Nguyen
*Attorney, Agent, or Firm*—Wagner, Murabito & Hao; Steven A. Shaw

[57] ABSTRACT

A texture value determining (TVD) circuit approximates non-homogenous 2nd order perspective texture mapping to provide texture for a polygon using linear interpolation and input parameters. The TVD circuit of the present invention includes a vertical walk subcircuit and an orthogonal walk subcircuit. The vertical walk subcircuit determines texture coordinates, $u(a_{0,n})$ and $v(a_{0,n})$ that represent the pixels along a vertical main slop of a triangle polygon. The orthogonal walk subcircuit determines texture coordinates, $u(a_{m,n})$ and $v(a_{m,n})$, for orthogonally walked polygon coordinate positions for which m>0. The orthogonally walked coordinate positions represent individual scan lines. The vertical walk subcircuit of the TVD circuit includes adders, latches, and accumulators. Each element of the vertical walk subcircuit receives a vertical main slope clock (n-clock) signal. An output of the vertical walk subsystem is computed based on the relationship,

$$u(a_{0,n})=u(a_{0,\ n-1})+du_{main}+(n-1)d^2u_{main} \text{ for m=0, n>0}$$

where $du_{main}$ and $d^2u_{main}$ are input parameters. The orthogonal walk subcircuit also includes adders, latches, and accumulators. The orthogonal walk subcircuit is clocked by an orthogonal walk (m-clock) signal as well as the n-clock signal. An output of the orthogonal walk subcircuit is computed based on the relationship, $$u(a_{m,n})=u(a_{m-1,\ n})+n(du_{ortho-ADD})+du_{ortho}+(m-1)d^2u_{ortho} \text{ for m>0}$$

where $du_{ortho}$-ADD and $du_{ortho}$ and $d^2u_{ortho}$ are input parameters.

9 Claims, 8 Drawing Sheets

CIRCUIT FOR DETERMINING NON-HOMOGENOUS SECOND ORDER PERSPECTIVE TEXTURE MAPPING COORDINATES USING LINEAR INTERPOLATION

FIELD OF THE INVENTION

The present invention relates to the field of computer controlled graphics display systems. More specifically, the present invention relates to computer controlled graphics display systems utilizing interpolation to perform certain graphics features.

BACKGROUND OF THE INVENTION

Computer controlled graphics systems are used for displaying graphics objects on a display. These graphics objects are composed of graphics primitive elements ("graphics primitives") that include points, lines, polygons, etc. The graphics primitives can be used to render a 2 dimensional (2-D) image of a three dimensional (3-D) object on a display screen. Texture mapping refers to techniques for adding surface detail to areas or surfaces of these 3-D graphics objects displayed on a 2-D display. Since the original graphics object is 3-D, texture mapping often involves maintaining certain perspective attributes with respect to the surface detail added to the object. Generally, texture mapping occurs by accessing encoded surface detail points or "texels" from a memory storing the surface detail and transferring the surface detail texels to predetermined points of the graphics primitive to be texture mapped. The manner in which the texels are accessed is used to provide the perspective discussed above.

Figure 1A:
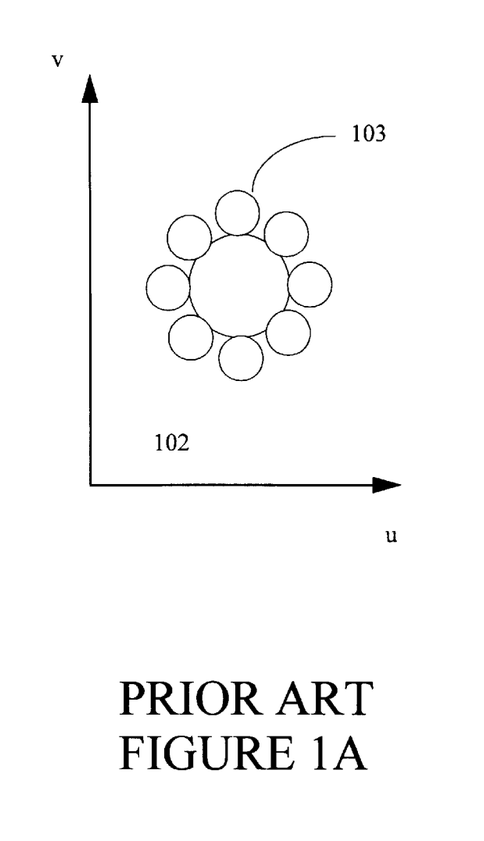
FIG. 1A represents a texture map.
Figure 1B:
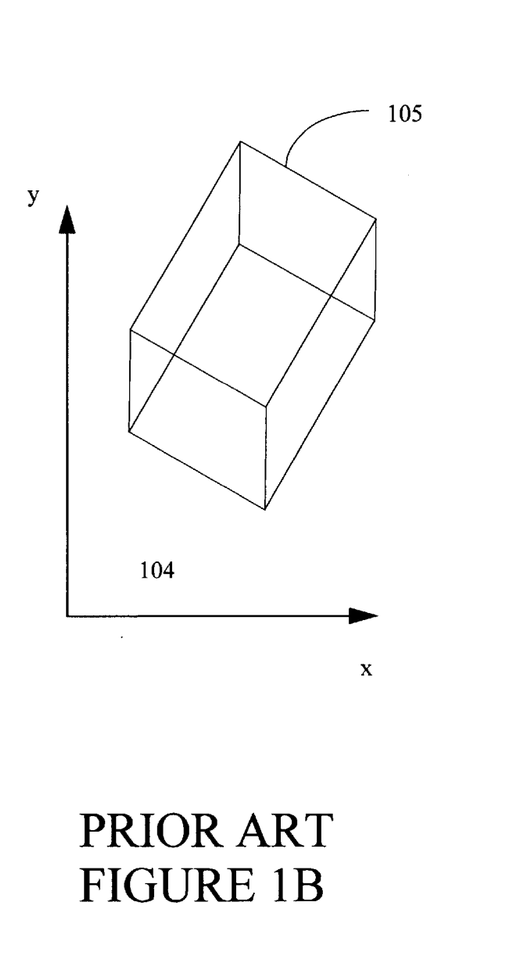
FIG. 1B represents a display screen.

With reference to prior art FIGS. 1A and 1B, a texture map 102 and a display screen 104 are shown. The texture map 102 contains a texture image 103 to be mapped onto an area or surface of a graphics object 105 on the display screen 4. The texture map 102 includes point elements (texels) which reside in a (u, v) texture coordinate space. The texture image 103 is represented in computer memory as a bitmap or other raster-based encoded format. The display screen 104 includes point elements (pixels) which reside in an (x, y) display coordinate space. More specifically, texture mapping operates by applying color or visual attributes of texels of the (u, v) texture map 102 to corresponding pixels of the graphics object 105 on the display screen 104. In texture mapping, color values for pixels in (x, y) display coordinate space are determined based on sampled texture map values. After texture mapping, a version of the texture image 103 is visible on surfaces of the object 5.

Three types of texture mapping are described below, linear, second order homogeneous perspective and second order non-homogeneous perspective. In linear texture mapping, texels of a texture map are generally mapped onto pixels of a 2-D or 3-D graphics object linearly whereby the rate of sampling in texel space with respect to the screen coordinate update rate is constant, e.g., du/dx and du/dy are constant values. In perspective texture mapping, texels of a texture map are generally mapped onto pixels of a 3-D graphics object that is displayed in 2-D space (x, y) wherein the rate of sampling in texel space with respect to the rate of screen coordinate update rate is not constant. Perspective texture mapping features an illusion of depth which is created by varying the sampling rate of the texture map 102 during the normal linearly performed polygon rendering process on the display screen 104. With reference to prior art FIG. 1A and FIG. 1B, the texture image 103 is mapped onto surfaces of a 2-D rendition of the 3-D graphics object 105 on the display screen 104.

Figure 2A:
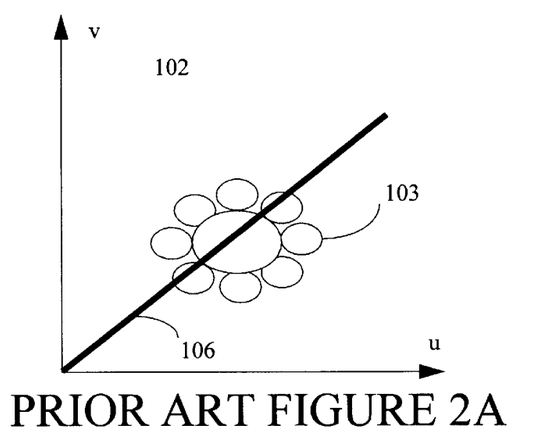
FIG. 2A is a prior art linear sampling path for sampling a texture map.

With reference to prior art FIG. 2A, a linear texture sampling path 106 is shown in the (u, v) texture coordinate space that is traversed (e.g., "sampled") during texture map sampling. During linear texture map sampling, the texture image 103 is sampled according to path 106 simultaneously with a well known linear polygon rendering process. Path 106 can be represented by a linear equation of u and v. Each texel of the texture map 102 is defined according to (u, v) coordinates. The rates of change of u and v with respect to x and y (e.g., du/dx, du/dy, dv/dx, and dv/dy) of the linear sampling path 106 of FIG. 2A, are constant values for linear texture map sampling.

Figure 2B:
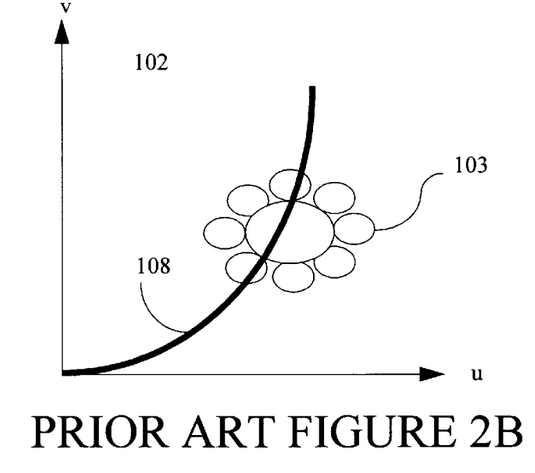
FIG. 2B is a prior art homogenous 2nd order perspective sampling path for sampling a texture map.

With reference to FIG. 2B, a second order homogeneous perspective texture sampling path 108 is shown in (u, v) texture coordinate space. The rates of change of u and v with respect to x and y (e.g., du/dx, du/dy, dv/dx, and dv/dy) of the second order homogeneous perspective sampling path 8 are varying values. However, the rates of change of the rates of change of u and v with respect to x and y (e.g., $d^2u/dx^2$, $d^2u/dy^2$, $d^2v/dx^2$, and $d^2v/dy^2$) of the second order homogenous perspective sampling path 8 are constant and thus homogenous values. During homogenous second order texture map sampling, the texture map 102 is sampled according to path 108 during the polygon rendering process. Path 108 can be represented by a homogenous second order polynomial equation of u and v.

Figure 2C:
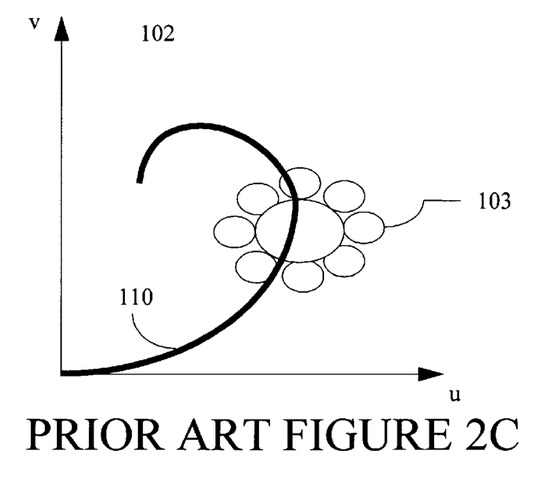
FIG. 2C is a prior art non-homogenous 2nd order perspective sampling path for sampling a texture map.

With reference to Prior Art FIG. 2C, a non-homogenous second order perspective sampling path 110 is shown in (u, v) texture coordinate space. The rates of change of u and v with respect to x and y (e.g., du/dx, du/dy, dv/dx, and dv/dy) along sampling path 110 are varying values. The rates of change of the rates of change of u and v with respect to x and y (e.g., $d^2u/dx^2$, $d^2u/dy^2$, $d^2v/dx^2$, and $d^2v/dy^2$) of the second order perspective sampling path 110 are also varying values and non-homogenous (e.g., the second order rate of change of u is defined by multiple functions of v). During non-homogenous second order texture map sampling, the texture map 102 is sampled according to path 110 during the polygon rendering process. Path 110 can be represented by a non-homogenous second order non-homogenous polynomial equation of u and v.

In typical prior art second order perspective texture mapping techniques, linear terms are generated and divided by perspective terms to obtain perspective texture map sample coordinates, T(u, v), for a given display coordinate in (x, y) display coordinate space. The coordinates (u, v) can then be used to obtain an attribute value from a texture map, T, according to T(u, v). The relationship below illustrates an exemplary second order perspective texture mapping relationship in which linear terms, Du and Dv, are divided by perspective terms, W(x, y, z), which represent depth, to obtain perspective texture map sample position rates of change, du and dv, $$(du, dv) = (du/W(x, y, z), dv/W(x, y, z)).$$

From du and dv, the texture coordinates (u, v) are computed in the prior art.

A problem associated with the above described prior art second order perspective texture mapping technique is that it is costly to implement in terms of processor time and integrated circuit real estate due to the repetitive divide operation. Divide operations are computationally expensive. Thus a need exists for a second order perspective texture mapping apparatus which is not costly to implement in terms of processor time and integrated circuit real estate. What is needed further is an apparatus for second order perspective texture mapping that eliminates the repetitive division operation required by prior art texture mapping techniques.

Accordingly, the present invention provides a circuit for efficiently performing non-homogeneous second order texture mapping functions without the need of a divide operation. These and other advantages of the present invention not described above will become clear in view of the following detailed description of the present invention.

BRIEF DESCRIPTION OF THE DRAWINGS

Prior Art

Prior Art

Prior Art

Prior Art

Prior Art

SUMMARY OF THE INVENTION

The present invention provides a texture value determining circuit (TVD circuit) for approximating non-homogenous 2nd order perspective texture mapping to provide texture for a polygon. Attribute, e.g., color, values for pixels in (x, y) display coordinate space are determined based on texture map values generated by the TVD circuit of the present invention. The TVD circuit of the present invention determines texture coordinates, $u(a_{m,n})$ and $v(a_{m,n})$, for polygon coordinates, $a_{m,n}$. Texture coordinates, $u(a_{m,n})$ and $v(a_{m,n})$, are used as indexes into a texture map, $T(u,v)$, to determine colors or visual attributes of display pixels rendered in (x, y) display coordinate space on a display screen. Within the present invention, determining values for texture coordinates, $u(a_{m,n})$ and $v(a_{m,n})$, involves non-homogenous second order perspective texture map sampling of a texture map.

The TVD circuit of the present invention includes a vertical walk subcircuit and an orthogonal walk subcircuit. The vertical walk subcircuit determines texture coordinates, $u(a_{m,n})$ and $v(a_{m,n})$, for all vertically walked polygon coordinate positions which include the first polygon coordinates, $a_{0,n}$, of each row, n, of the texture polygon. This represents the pixels along the major slope of a triangle polygon. The orthogonal walk subcircuit determines texture coordinates, $u(a_{m,n})$ and $v(a_{m,n})$, for orthogonally walked polygon coordinate positions which correspond to the individual scan lines within the triangle polygon. Orthogonally walked polygon coordinate positions include each polygon coordinate position for which m>0 and exclude the vertically walked polygon coordinate positions, $u(a_{0,n})$ and $v(a_{0,n})$, for which m=0.

The vertical walk subcircuit of the TVD circuit includes a first adder, a second adder, and a third adder. The vertical walk subcircuit also includes a first latch, a second latch, and a third latch. The vertical walk subcircuit further includes a first accumulator, a second accumulator, and a third accumulator. Each element of the vertical walk subcircuit receives a vertical slope walk clock signal (n-clock signal). The first accumulator includes a first input coupled to receive an initial value, u(0,0), from a data input bus and a second input coupled to receive a sum output from an output of a first adder. The first adder includes an input coupled to receive an output of a second accumulator. An output of the first accumulator yields a relationship, $$u(a_{0,n})=u(a_{0,\,n-1})+K1+(n-1)*K2 \text{ for m=0, n>0;}$$

The second accumulator includes a first input coupled to receive an initial value, K1, from the data input bus and a second input coupled to receive a sum output from an output of a second adder. The second adder includes an input coupled to receive a latched initial value, K2, via the data input bus. An output of the second accumulator yields a value according to the relationship, $$K1+(n-1)*K2 \text{ for m=0, n>0.}$$

The third accumulator includes a first input coupled to receive an initial value, K3, from the data input bus and a second input coupled to receive a sum output from an output of the third adder. The third adder includes an input coupled to receive a latched initial value, K4, via the data input bus. An output of the third accumulator yields a value according to the relationship, $$K3+nK4 \text{ for m=0, n>0.}$$

The orthogonal walk subcircuit includes a fourth adder and a fifth adder. The orthogonal walk subcircuit also includes a fourth accumulator and a fifth accumulator. Each element of the orthogonal walk subcircuit receives an orthogonal walk clock signal (m-clock signal).

The fourth accumulator includes a first input coupled to receive an initial value, $u(a_{0,\,n})$. The fourth accumulator also includes a second input coupled to receive a sum output from an output of the fourth adder. The fourth adder includes an input coupled to receive a signal from an output of a fifth accumulator. An output of the fourth accumulator yields a relationship, $$u(a_{m,n})=u(a_{m-1,\,n})+n(K4)+K3+(m-1)*K5 \text{ for m>0.}$$

The fifth accumulator includes a first input coupled to receive a signal from the output of the third accumulator of the vertical walk subcircuit. A second input of the fifth accumulator is coupled to receive a sum output from an output of the fifth adder wherein the fifth adder includes an input coupled to receive a latched initial value, K5, via the data input bus. An output of the third accumulator yields a value according to the below relationship, $$K3+n(K4)+(m-1)K5 \text{ for m>0.}$$

In a preferred embodiment of the present invention, the first input of the fourth accumulator is coupled to receive the initial value, $u(a_{0,n})$, from the output of the first accumulator of the vertical walk subcircuit. Texture coordinates, $u(a_{m,n})$ and $v(a_{m,n})$, are used to define a color for a display pixel in (x, y) display coordinate space. The color or visual attribute defined by texture coordinates, $u(a_{m,n})$ and $v(a_{m,n})$, is accessed from a texture map and can be expressed by relationship (4), below:

$$\text{Color}=T(u(a_{m,n}) \text{ and } v(a_{m,n})) \tag{4}$$

where T is a texture map in computer memory.

DESCRIPTION OF THE PREFERRED EMBODIMENTS

In the following detailed description of the present invention, a circuit for a non-homogenous second order perspective texture mapping system using linear interpolation parameters, numerous specific details are set forth in order to provide a thorough understanding of the present invention. However, it will be obvious to one skilled in the art that the present invention may be practiced without these specific details or by using alternate elements or processes. In other instances well known processes, procedures, components, and circuits have not been described in detail as not to unnecessarily obscure aspects of the present invention.

NOTATION AND NOMENCLATURE

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system. Herein, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, discussions utilizing terms such as "processing" or "computing" or "calculating" or "determining" or "displaying" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission or display devices.

Figure 3A:
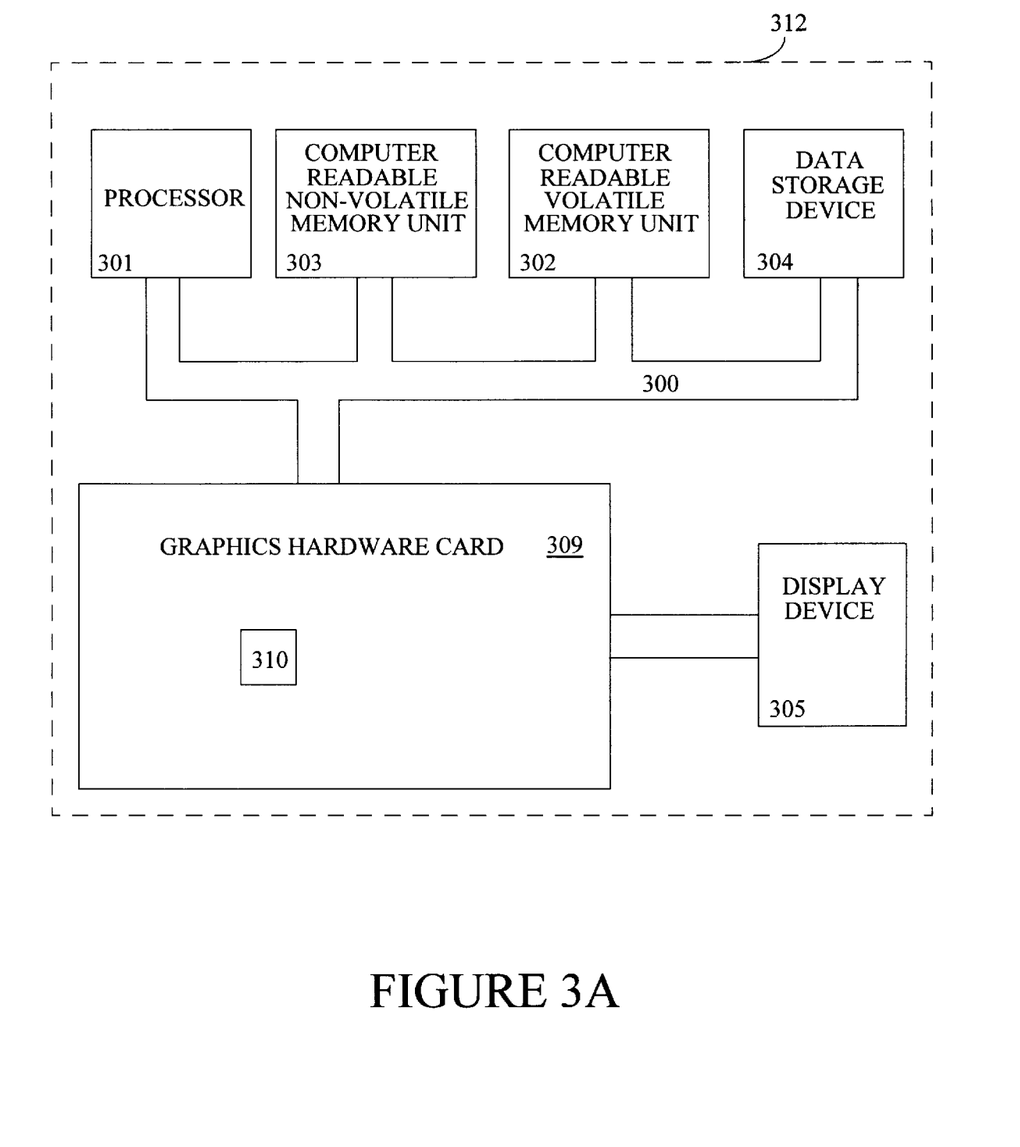
FIG. 3A is an exemplary host computer system for employing the computer implemented method of the present invention for second order perspective texture mapping using linear interpolation parameters.

With reference to FIG. 3A, a block diagram is shown of a host computer system 312 used by the preferred embodiment of the present invention. In general, host computer system 312 used by the preferred embodiment of the present invention comprises a bus 300 for communicating information, a host processor 301 coupled with the bus 300 for processing information and instructions, a computer readable volatile memory unit 302 (e.g. random access memory unit) coupled with the bus 300 for storing information and instructions for the host processor 301, a computer readable non-volatile memory unit 303 (e.g., read only memory unit) coupled with the bus 300 for storing static information and instructions for the host processor 301, a computer readable data storage device 304 such as a magnetic or optical disk and disk drive (e.g., hard drive or floppy diskette) coupled with the bus 300 for storing information and instructions, and a display device 305 coupled to the bus 300 for displaying information to the computer user. The display device 305 utilized with the computer system 312 of the present invention can be a liquid crystal device, cathode ray tube, or other display device suitable for creating graphic images and alphanumeric characters recognizable to the user.

Figure 3B:
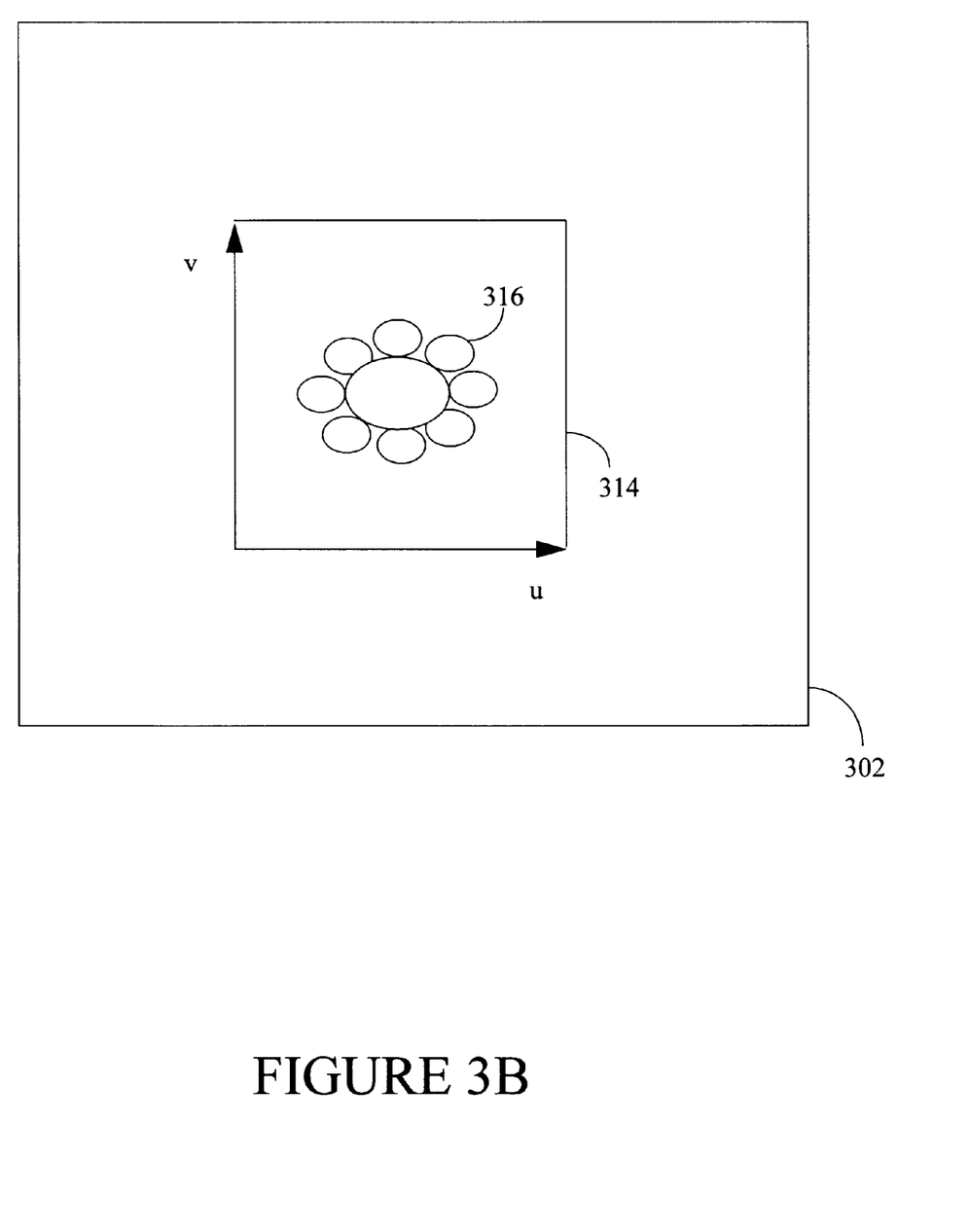
FIG. 3B represents a computer readable volatile memory unit containing a bit mapped texture map stored therein as used by the present invention.

The host system 312 provides data and control signals via bus 300 to a graphics hardware unit ("card") 309. The graphics hardware card 309 contains a display processor 310 which executes a series of display instructions found within a display list. The display processor 310 supplies data and control signals to a frame buffer which refreshes the display device 305 for rendering images (including graphics images) on display device 305. With reference to FIG. 3B, a block diagram is shown of the computer readable volatile memory unit 302 containing a texture map 314 stored therein.

The present invention provides an approximation for non-homogenous 2nd order perspective texture mapping which applies color or visual attributes of texels of a (u, v) configured texture map to surfaces of 3-D graphical objects represented in 2-D (x, y) display coordinate space. Color values for display pixels in (x, y) display coordinate space are determined based on data sampled from the texture map 314 and processed according to a 2nd order perspective texture mapping process of the present invention. Texture map 314 can include bit mapped data representative of an image 316.

Figure 4:
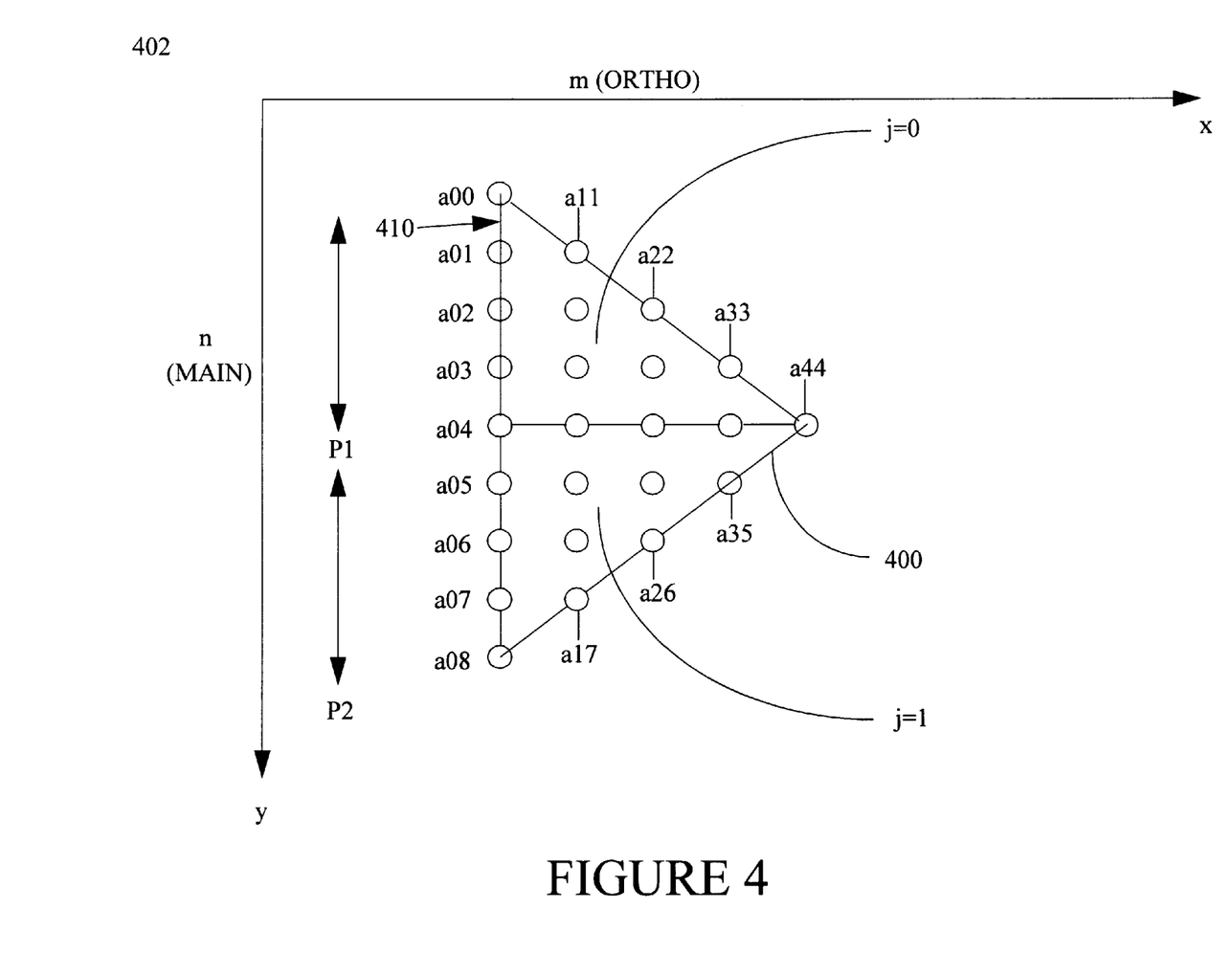
FIG. 4 is a texture polygon used by the present invention and comprised of polygon coordinates, $a_{m,n}$, in (m, n) texture polygon coordinate space.

With reference to FIG. 4, an exemplary texture polygon 400 is shown in an (m, n) polygon coordinate space 402 which has an orthogonal position coordinate, m, and a main (or vertical) position coordinate, n. The texture polygon 400 is comprised of polygon coordinates, $a_{m,n}$. The texture polygon 400 can be a triangle, as shown in FIG. 4, or any other polygon. The texture polygon 400 includes an upper half region, designated by j=0, and a lower half region designated by j=1 (FIG. 4). The upper half region of the exemplary texture polygon 400 includes P1 rows (or rows) and the lower half region of texture polygon 400 includes (P2-P1) rows. The major slope 410 of the triangle 400 spans from the upper vertex to its lower vertex and while shown vertical in FIG. 4, the major slope 410 can also be diagonal.

The present invention provides a 2nd order perspective texture mapping process which determines texture coordinates, $u(a_{m,n})$ and $v(a_{m,n})$, for each of the polygon coordinates, $a_{m,n}$. Texture coordinates, $u(a_{m,n})$ and $v(a_{m,n})$, are used as indexes to access data in the texture map 314 if FIG. 3B. Texture coordinates, $u(a_{m,n})$ and $v(a_{m,n})$ determine the color of display pixels rendered in corresponding (x, y) display coordinate space of the polygon 400 on the display device 305.

Determining values for texture coordinates, $u(a_{m,n})$ and $v(a_{m,n})$, involves second order perspective texture map sampling of the texture map 314 of FIG. 3B. In the present invention, the rate of change of u with respect to x, du/dx, is referred to as $du_{ortho}$. Similarly, the rate of change of u with respect to y, du/dy, is referred to as $du_{main}$. The rate of change of v with respect to x, dv/dx, is referred to as $dv_{ortho}$. The rate of change of v with respect to y, dv/dy, is referred to as $dv_{main}$. The rate of change of the rate of change of u with respect to x, $d^2u/dx^2$, is referred to as $d^2u_{ortho}$. The rate of change of the rate of change of u with respect to y, $d^2u/dy^2$, is referred to as $d^2u_{main}$. The rate of change of the rate of change of v with respect to x, $d^2v/dx^2$, is referred to as $d^2v_{ortho}$. The rate of change of the rate of change of v with respect to y, $d^2v/dy^2$, is referred to as $d^2v_{main}$. Parameters, $du_{ortho-ADD}$ and $dv_{ortho-ADD}$, are defined as offset values and are constants.

The pixels, $a_{m,n}$ of polygon 400 are rendered on display screen 305 from the top rows (or rows) downward and for each row, from the left most pixel (e.g., $a_{0,m}$) rightward to the far right pixel. As shown below, each pixel is processed separately for rendering on display screen 305. In view of the exemplary polygon 400 of FIG. 3B, the pixels are processed in the following order: $a_{0,0}$; $a_{0,1}$; $a_{1,1}$; $a_{0,2}$; $a_{1,2}$; $a_{2,2}$; $a_{0,3}$; $a_{1,3}$; $a_{2,3}$; $a_{3,3}$; . . . $a_{0,7}$; $a_{1,7}$; and $a_{0,8}$.

LINEAR INTERPOLATION PROCESS USING INPUT PARAMETERS

Figure 5:
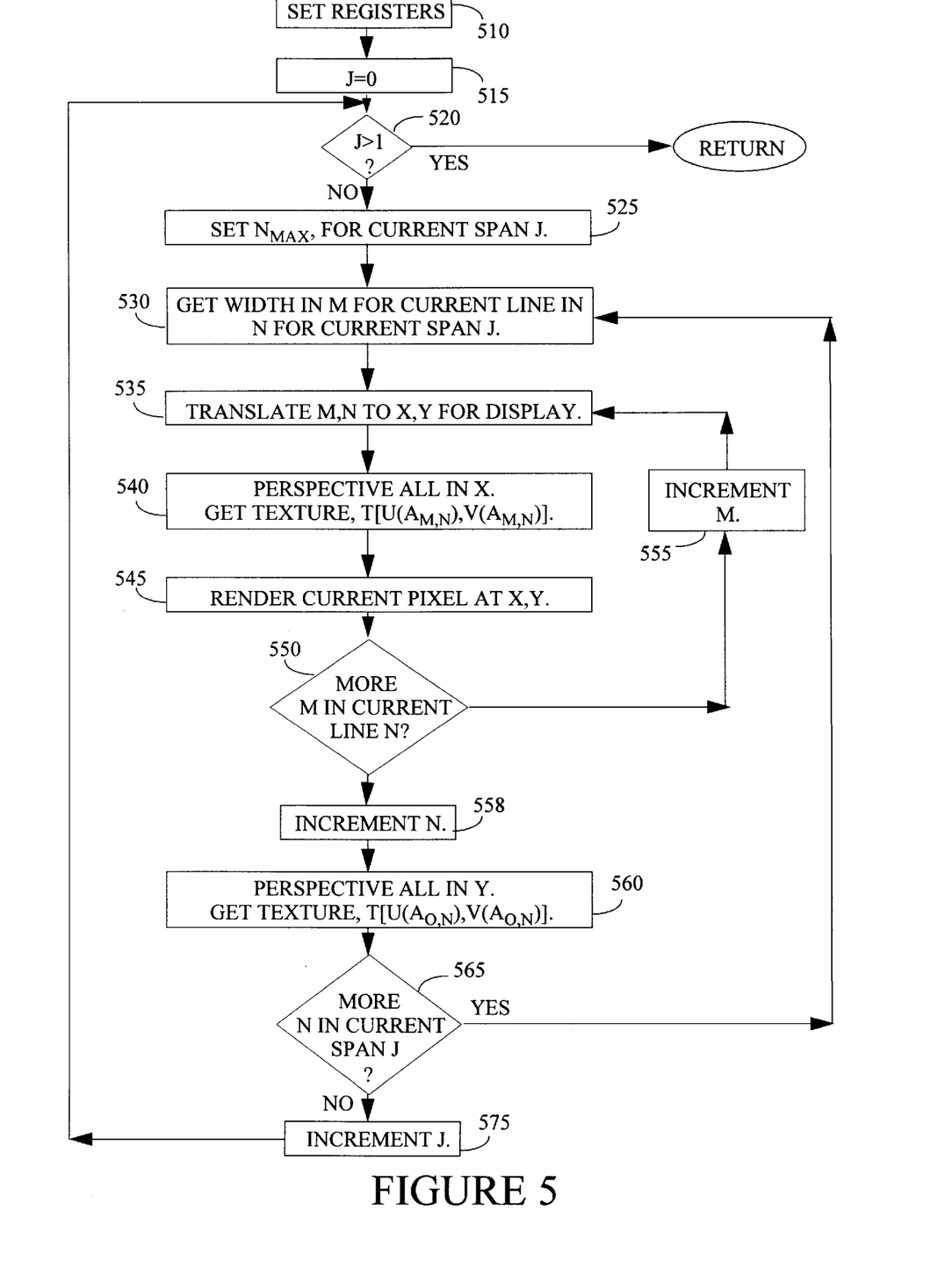
FIG. 5 is a flow diagram for implementing steps of the method of the present invention for second order perspective texture mapping using linear interpolation parameters.

FIG. 5 shows a flow diagram for implementing a process 500 according to the method of the present invention for non-homogenous second order perspective texture mapping using linear interpolation parameters. Process 500 includes polygon rendering and maps images or patterns from the (u, v) texture map 314 to a polygon in (x, y) display coordinate space on the display device 305. Texture coordinates, $u(a_{m,n})$ and $v(a_{m,n})$, are determined for each of the polygon coordinates, $a_{m,n}$, of FIG. 4. Texture coordinates, $u(a_{m,n})$ and $v(a_{m,n})$, are used to determine colors or visual attributes of display pixels rendered in (x, y) display coordinate space on the display device 305.

In operation, process 500 determines color values for pixels in (x, y) display coordinate space and then renders display pixels sequentially on the display device 305, horizontally from left to right and sequentially downward as orthogonal lines of pixels are fully rendered. It is appreciated however that the method of the present invention is also well suited to rendering pixels horizontally from right to left. The process 500 of the present invention is implemented as instructions stored in a computer readable memory unit of host computer system 312 and can be executed over the host processor 301 of FIG. 3 or over the display processor 310 of the peripheral graphics device 309 of FIG. 3A.

In step 510 of FIG. 5, values are received by process 500 for a set of parameters including $u_{-main}$, $v_{-main}$, $dv_{ortho}$, $dv_{main}$, $du_{ortho}$, $du_{main}$, $d^2u_{ortho}$, $d^2u_{main}$, $d^2v_{ortho}$, $d^2v_{main}$, $du_{ortho-ADD}$, and $dv_{ortho-ADD}$. The initial texture coordinates, $u(a_{0,0})$ and $v(a_{0,0})$, are set equal to $u_{-main}$ and $v_{-main}$ respectively. The above parameters are computed based on a process described in patent application Ser. No. 08/779,787, filed on Dec. 30, 1996, entitled Method for Computing Parameters Used in a Non-Homogeneous Second Order Perspective Texture Mapping Processing Using Interpolation, assigned to the assignee of the present invention, and having an attorney docket number of CRUS-096-0030. Also at step 510, the values of m and n are set to initial values (e.g., m=0 and n=0).

In step 515, a span value, j, is set to an initial value. In the preferred embodiment of the present invention, the upper half region of the texture polygon 400 of FIG. 4 is designated when span, j, is equal to 0 and the lower half region of the texture polygon 400 is designated when span, j, is equal to 1.

In step 520 of FIG. 5, it is determined whether j>1. The upper half region of the texture polygon 400 of FIG. 4 is processed while span, j, is equal to 0 and the lower half region of the texture polygon 400 is processed while span, j, is equal to 1. If j<=1, process 500 proceeds to step 525. If j>1, process 500 terminates.

In step 525 of FIG. 5, the total number of rows, n, is determined for the half region of texture polygon 400 designated by the current span, j (FIG. 4). Provided that j=0, the number of orthogonal lines to be processed, in the upper half region of the texture polygon 400, is equal to P1. The value, $n_{max}$, is equal to P1 at step 525. Provided that j=1, the number of orthogonal lines to be processed, in the lower half region of exemplary texture polygon 400, is equal to (P2-P1). This value, $n_{max}$, is set to (P2-P1) at step 525 for this case.

Step 530 of FIG. 5 determines the number of polygon coordinates, $a_{m,n}$, in the current row, n, of the texture polygon 400 (FIG. 4). This is the row width. For example, if n=0, then it is determined in step 530 that there is one polygon coordinate, $a_{0,0}$, in the orthogonal line defined by n=0 (FIG. 4). If n=1, then it is determined in step 530 that there are two polygon coordinates, $a_{0,1}$ and $a_{1,1}$ in the orthogonal line defined by n=0 (FIG. 4).

At step 535, the current polygon position in (m, n) polygon coordinate space is translated into a corresponding display position in (x, y) display coordinate space. Once the position of polygon coordinate space (m, n) is known with respect to the display coordinate space position (x, y), step 535 can be implemented using well known translation techniques.

In step 540 of FIG. 5, texture coordinates, $u(a_{m,n})$ and $v(a_{m,n})$, are determined for the current polygon coordinate, $a_{m,n}$, according to Relationships 2A and 2B, below:

$$u(a_{m,n})=u(a_{m-1,n})+du_{ortho(n)}+(m-1)d^2u_{ortho} \text{ for } m>0 \quad (2A)$$

$$v(a_{m,n})=v(a_{m-1,n})+dv_{ortho(n)}+(m-1)d^2v_{ortho} \text{ for } m>0; \quad (2B)$$

wherein $du_{ortho}(n)$ and $dv_{ortho}(n)$ are determined according to relationships 3A and 3B, below:

$$du_{ortho(n)}=n(du_{ortho\ ADD})+du_{ortho} \text{ for all n;} \quad (3A)$$

$$dv_{ortho(n)}=n(dv_{ortho\ ADD})+dv_{ortho} \text{ for all n;} \quad (3B).$$

wherein $du_{orthoADD}$, $dv_{orthoADD}$, $du_{ortho}$, and $dv_{ortho}$ are input parameters and are constants.

Step 540 of FIG. 5 is used to determine values for texture coordinates, $u(a_{m,n})$ and $v(a_{m,n})$, for all polygon coordinate positions along the current line, n, other than the first polygon coordinates, $a_{0,n}$, of each row, n, of the texture polygon 400 of FIG. 4. On the first pass through step 540 for a new line, n, m=0. Texture coordinates, $u(a_{0,n})$ and $v(a_{0,n})$, for the first polygon coordinate positions, $a_{0,n}$, of each row, n, of the texture polygon 400 of FIG. 4, are determined according to steps described below with respect to step 560.

At step 545, texture coordinates, $u(a_{m,n})$ and $v(a_{m,n})$, are used to define a color for a display pixel in (x, y) display coordinate space. The color or texture defined by texture coordinates, $u(a_{m,n})$ and $v(a_{m,n})$, can be expressed by Relationship (4), below:

$$\text{Color}=T[u(a_{m,n}) \text{ and } v(a_{m,n})] \quad (4),$$

wherein T[u, v] refers to the color or texture at the (u,v) texture coordinates of the texture map 314.

Step 545 of FIG. 5 obtains the color value, color, and renders a display pixel on the display device 305 wherein the pixel color or texture is defined by texture coordinates, $u(a_{m,n})$ and $v(a_{m,n})$ for the current polygon coordinate, $a_{m, n}$. The display pixel rendered on the display device 305 by step 545 is positioned at the (x, y) display coordinate position, corresponding to the current polygon coordinate, $a_{m, n}$, defined in step 535 above. The color of the display pixel rendered on display device 305 in step 545 is determined according to Relationship (4) above.

Step 550 of FIG. 5 determines whether there are more polygon coordinates, $a_{m,n}$, to be processed for the current row, n, of texture polygon 400 by comparing n to the current row width obtained at step 530. If there are more polygon coordinates, $a_{m,n}$, for the current row, n, of the texture polygon 400, then process 500 proceeds to step 555, which increments the value of m by one. From step 555, process 500 proceeds back to step 535 to set an (x, y) display coordinate corresponding to the new current polygon coordinate, $a_{m,n}$. At step 535, the polygon position in (m, n) polygon coordinate space is translated into a corresponding (x, y) display coordinate space. In this manner all pixels from m>0 of the given row, n, are rendered on the display device 305. At step 550, if the current value of m equals the width in m defined for the current row, then no more coordinates in $a_{m,n}$ are in the current row, n. At step 550, if there are no more polygon coordinates, $a_{m,n}$, to be processed for the current row, n, of the texture polygon 400, then process 500 proceeds to step 558.

In step 558, the value of n is incremented to access a new polygon row and process 500 proceeds to process the next row, n, of texture polygon coordinates, $a_{m,n}$, of the texture polygon 400 of FIG. 4. From step 558, process 500 proceeds to step 560

Step 560 of FIG. 5 determines values for texture coordinates, $u(a_{0,n})$ and $v(a_{0,n})$, for the current polygon coordinate, $a_{0,n}$ (except for $a_{0,0}$ for which an initial value is assumed in step 510 above). Each of the polygon coordinates, $a_{0,n}$ is the first polygon coordinate in the current row, n, of the texture polygon 400 (FIG. 4). Values for $u(a_{0,n})$ and $v(a_{0,n})$ are determined for the current polygon coordinate, $a_{0,n}$, by implementing Relationships (5A) and (5B), below;

$$u(a_{0,n}) = u(a_{0,n-1}) + du_{main} + (n-1)d^2u_{main} \text{ for m=0, n>0} \quad (5A)$$

$$v(a_{0,n}) = v(a_{0,n-1}) + dv_{main} + (n-1)d^2v_{main} \text{ for m=0, n>0}; \quad (5B)$$

wherein $du_{main}$, $d^2u_{main}$, $dv_{main}$, and $d^2v_{main}$ are input parameters and are constant.

Step 565 determines whether there are more rows, n, of polygon coordinates, $a_{m,n}$, to be processed for the current span, j, of the texture polygon 400 of FIG. 4. This is performed by comparing the current count, n, to the current value of $n_{max}$. If $n > n_{max}$, then there are no more rows in the current span to process. If rows remain, then process 500 proceeds back to step 530 and again through steps 530–565 to process the next line, n, of polygon coordinates, $a_{m,n}$, in the texture polygon 400. If there are no more rows, n, of polygon coordinates, $a_{m,n}$, to be processed for the current span, j, of the texture polygon 400, then process 500 proceeds to step 575 which increments the value of span, j, by 1. From step 575, process 500 proceeds back to step 520 which determines whether j>1. If j<=1, process 500 proceeds to step 525 to process polygon coordinates, $a_{m,n}$, for the next span of texture polygon 400. If j>1, process 500 terminates.

By receiving the initial values and constants in step 510 and using the above relationships of step 540 and step 560, the present invention provides an effective polygon texture method 500 that eliminates the processor intensive divide operation used by prior art systems. In lieu of the expensive divide, the present invention utilizes a linear interpolation driven technique based on a set of interpolation parameters received at step 510.

TVD CIRCUIT OF THE PRESENT INVENTION

Figure 6:
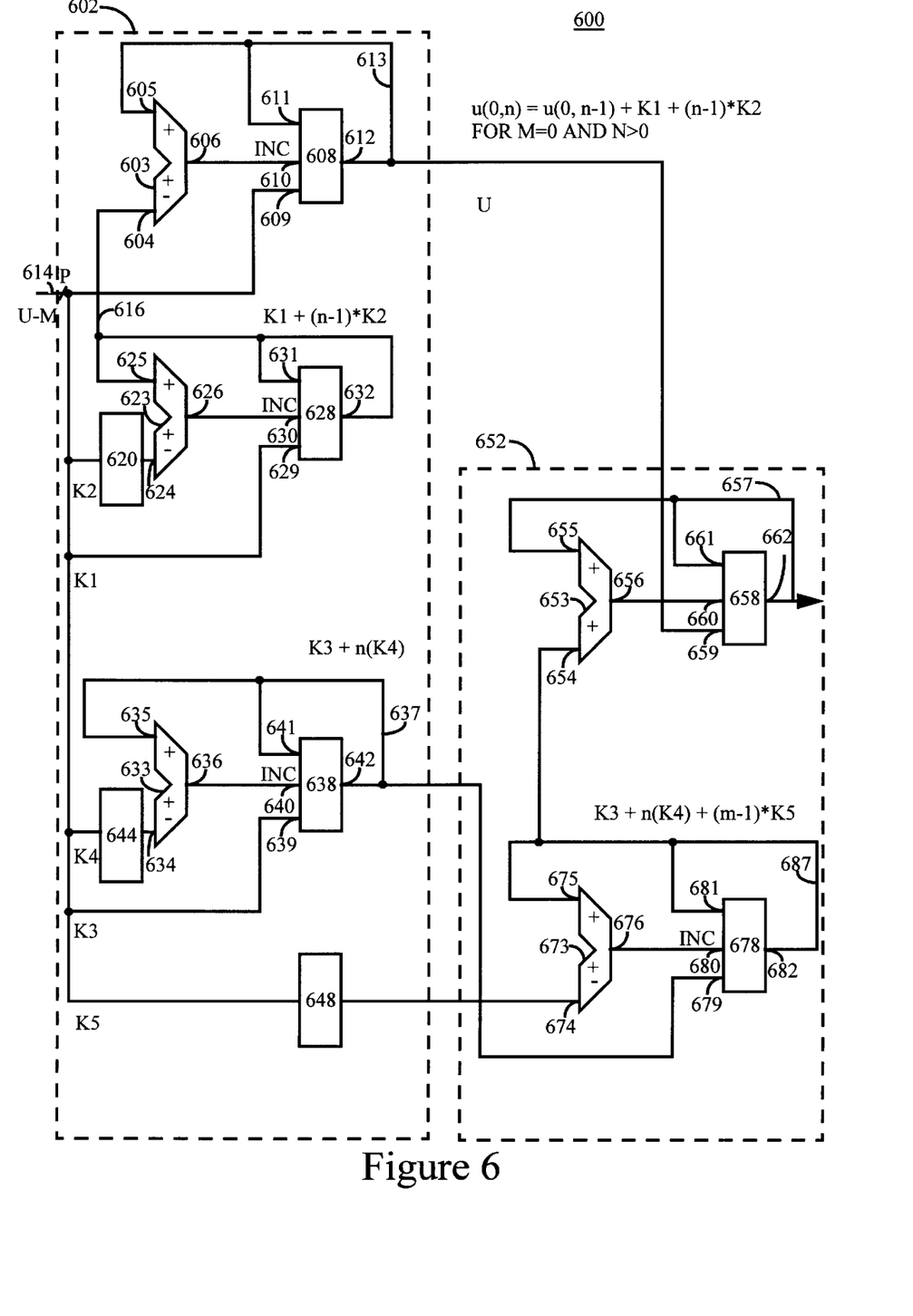
FIG. 6 is a circuit diagram of a texture value determining circuit (TVD circuit) according to the present invention.

With reference to FIG. 6, a texture value determining circuit (TVD circuit) 600 according to the present invention is shown. In one implementation of the present invention, the TVD circuit 600 is used to determine texture coordinates, $u(a_{0,n})$ and $v(a_{0,n})$, for the current polygon coordinate, $a_{m,n}$, according to relationships (2A), (2B), (3A), (3B), (5A), and (5B), above, during the polygon rendering process. In this embodiment, dedicated hardware circuitry (e.g., TVD circuit 600) is used to compute the linear interpolation terms rather than a general purpose computer system, as described above.

The TVD circuit 600 includes a vertical walk subcircuit 602 for determining texture coordinates, $u(a_{m,n})$ and $v(a_{m,n})$, for all vertically walked polygon coordinate positions, e.g., those along the major slope 410 of the triangle polygon (FIG. 4). Vertically walked polygon coordinate positions include the first polygon coordinates, $a_{0,n}$, of each row, n, of the texture polygon along the polygon's main slope. Texture coordinates, $u(a_{0,n})$ and $v(a_{0,n})$, for vertically walked polygon coordinate positions, $a_{0,n}$, of the texture polygon are determined according to relationships (5A) and (5B) reprinted below.

$$u(a_{0,n}) = u(a_{0,n-1}) + du_{main} + (n-1)d^2u_{main} \text{ for m=0, n>0} \quad (5A)$$

$$v(a_{0,n}) = v(a_{0,n-1}) + dv_{main} + (n-1)d^2v_{main} \text{ for m=0, n>0}; \quad (5B)$$

wherein $du_{main}$, $d^2u_{main}$, $dv_{main}$, and $d^2v_{main}$ are input parameters and are constants.

The TVD circuit 600 also includes an orthogonal walk subcircuit 652 for determining texture coordinates, $u(a_{m,n})$ and $v(a_{m,n})$, for orthogonally walked polygon coordinate positions (e.g., along a horizontal scan line). Orthogonally walked polygon coordinate positions include each polygon coordinate position for which m>0 and exclude the vertically walked polygon coordinate positions, $u(a_{0,n})$ and $v(a_{0,n})$, for which m=0. The orthogonal walk subcircuit 652 is used to implement relationships (2A), (2B), (3A) and (3B), reprinted below, $$u(a_{m,n}) = u(a_{m-1,n}) + du_{ortho(n)} + (m-1)d^2u_{ortho} \text{ for m>0} \quad (2A)$$

$$v(a_{m,n}) = v(a_{m-1,n}) + dv_{ortho(n)} + (m-1)d^2v_{ortho} \text{ for m>0}; \quad (2B)$$

wherein $d^2u_{ortho(n)}$ and $d^2v_{ortho(n)}$ are the input parameters and are constant The values, $du_{ortho(n)}$ and $dv_{ortho(n)}$, are determined according to relationships (3A) and (3B), reprinted below, $$du_{ortho(n)} = n(du_{ortho\ ADD}) + du_{ortho} \text{ for all n}; \quad (3A)$$

$$dv_{ortho(n)} = n(dv_{ortho\ ADD}) + dv_{ortho} \text{ for all n}; \quad (3B)$$

wherein $du_{orthoADD}$, $dv_{orthoADD}$, $du_{ortho}$, and $dv_{ortho}$ are all input parameters and are constant values.

With reference to FIG. 6, it is understood that the vertical walk subcircuit 602 can be used to implement relationships having the same form as relationships (5A) and (5B) above. Specifically, the vertical walk subcircuit 602 can be used to implement relationships of the form of relationships (6A) and (6B) below, $$u(a_{0,n}) = u(a_{0,\ n-1}) + K1 + (n-1)K2 \text{ for } m=0,\ n>0 \quad (6A)$$

$$v(a_{0,n}) = v(a_{0,\ n-1}) + K1 + (n-1)K2 \text{ for } m=0,\ n>0; \quad (6B)$$

wherein K1 and K2 are constant values.

With reference to FIG. 6, it is also understood that the orthogonal walk subcircuit 652 can be used to implement relationships having the same form as relationships (2A), (2B), (3A) and (3B) above. Specifically, the orthogonal walk subcircuit 602 can be used to implement relationships of the form of relationships (7A), (7B), (8A) and (8B) below, $$u(a_{m,n}) = u(a_{m-1,\ n}) + du_{ortho(n)} + (m-1)K5 \text{ for } m>0 \quad (7A)$$

$$v(a_{m,n}) = v(a_{m-1,\ n}) + dv_{ortho(n)} + (m-1)K5 \text{ for } m>0; \quad (7B)$$

wherein K5 is a constant value. The values, $du_{ortho(n)}$ and $dv_{ortho(n)}$, are determined according to relationships (8A) and (8B), below:

$$du_{ortho(n)} = n(K4) + K3 \text{ for all } n; \quad (8A)$$

$$dv_{ortho(n)} = n(K4) + K3 \text{ for all } n; \quad (8B)$$

wherein K3 and K4 are constant values. Substituting relationships (8A) and (8B) into relationships (7A) and (7B) respectively results in relationships (9A) and (9B), below.

$$u(a_{m,n}) = u(a_{m-1,\ n}) + n(K4) + K3 + (m-1)K5 \text{ for } m>0 \quad (9A)$$

$$v(a_{m,n}) = v(a_{m-1,\ n}) + n(K4) + K3 + (m-1)K5 \text{ for } m>0; \quad (9B)$$

The orthogonal walk subcircuit 652 can be used to implement relationships having the same form as relationships (9A) and (9B).

With reference to FIG. 6, the vertical walk subcircuit 602 of the TVD circuit 600 includes a first adder 603, a second adder 623, and third adder 633. The vertical walk subcircuit 602 also includes a first latch 620, a second latch 644, and a third latch 648. The vertical walk subcircuit 602 further includes a first accumulator 608, a second accumulator 628, and a third accumulator 638. Each element of the vertical walk subcircuit 602 receives a vertical slope walk clock signal, also called the n-clock. The vertical slope walk clock signal cycles for each scan line of the polygon being rendered.

With reference to FIG. 6, a data input bus 614 is used to provide the vertical walk subcircuit 602 of the TVD circuit 600 with a set of six input values as described below. In one embodiment, the data input bus 614 includes p lines and includes capacity for at least six individual buses. In another embodiment, these input parameters can also be time multiplexed over a single, smaller, bus 614. A first input 609 of the first accumulator 608 is coupled to receive an initial value, $u_{-main}$, via the data input bus 614. A second input 610 of the first accumulator 608 is coupled to receive a sum output from an output 606 of the first adder 603. A third input 611 of the first accumulator 608 is coupled to the output 612 of the first accumulator 608 via a bus 613. A first input 605 of the first adder 603 is also coupled to the output 612 of the first accumulator 608 via the bus 613. A second input 604 of the first adder 603 is coupled to receive a signal from an output 632 of the second accumulator 628 via a bus 616.

With reference to FIG. 6, an input of the first latch 620 is coupled to receive an initial value, $d^2u_{main}$, via the data input bus 614. A first input 624 of the second adder 623 is coupled to receive the latched initial value, $d^2u_{main}$, via an output of the first latch 620. A first input 629 of the second accumulator 628 is coupled to receive an initial value, $du_{main}$, via the data input bus 614. A second input 630 of the second accumulator 628 is coupled to receive a sum output from an output 626 of the second adder 623. A third input 631 of the second accumulator 628 is coupled to the output 632 of the second accumulator 628 via the bus 616. A second input 625 of the second adder 623 is also coupled to the output 632 of the second accumulator 628 via the bus 616.

With reference to FIG. 6, an input of the second latch 644 is coupled to receive an initial value, $du_{ortho-ADD}$, via the data input bus 614. A first input 634 of the third adder 633 is coupled to receive the latched initial value, $du_{ortho-ADD}$, from an output of the second latch 644. A first input 639 of the third accumulator 638 is coupled to receive an initial value, $du_{ortho}$, via the data input bus 614. A second input 640 of the third accumulator 638 is coupled to receive a sum output via an output 636 of the third adder 633. A third input 641 of the third accumulator 638 is coupled to an output 642 of the third accumulator 638 via a bus 637. A second input 635 of the third adder 633 is also coupled to the output 642 of the third accumulator 638 via the bus 637.

The orthogonal walk subcircuit 652 includes a fourth adder 653 and a fifth adder 673. The orthogonal walk subcircuit 652 also includes a fourth accumulator 658 and a fifth accumulator 678. Each element of the orthogonal walk subcircuit 652 receives an orthogonal walk clock signal also called the m-clock. The orthogonal walk clock is updated for each pixel position with a scan line of the polygon during rendering.

With reference to FIG. 6, a first input 659 of the fourth accumulator 658 is coupled to receive a signal from the output 612 of the first accumulator 608 of the vertical walk subcircuit 602 via the bus 613. A second input 660 of the fourth accumulator 658 is coupled to receive a sum output via an output 656 of the fourth adder 653. A third input 661 of the fourth accumulator 658 is coupled to an output 662 of the fourth accumulator 658 via a bus 657. A first input 655 of the fourth adder 653 is also coupled to the output 662 of the fourth accumulator 658 via the bus 657. A second input 654 of the fourth adder 653 is coupled to receive a signal from an output 682 of the fifth accumulator 678 via a bus 687.

An input of the third latch 648 is coupled to receive an initial value, $d^2u_{ortho}$, via the data input bus 614. A first input 674 of the fifth adder 673 is coupled to receive the latched initial value, $d^2u_{ortho}$, from an output of the third latch 648. A first input 679 of the fifth accumulator 678 is coupled to receive a signal from the output 642 of the third accumulator 638 via the bus 637. A second input 680 of the fifth accumulator 678 is coupled to receive a sum output from an output 676 of the fifth adder 673. A third input 681 of the fifth accumulator 678 is coupled to the output 682 of the fifth accumulator 678 via a bus 687. A second input 675 of the fifth adder 673 is also coupled to the output 682 of the fifth accumulator 678 via the bus 687.

With reference to FIG. 6, the TVD circuit 600 can be used to determine both "u" and "v" texture coordinate values according to the above described relationships. In one embodiment of the present invention, the "u" and "v" texture coordinate values are processed by the same circuit at different times. In another embodiment of the present invention, the "u" and "v" texture coordinate values are processed by separate circuits 600, each analogous to the circuit shown in FIG. 6. To determine "u" texture coordinate values, initial data values are received by the TVD circuit 600 for a set of six parameters including $u_{-main}$, $du_{ortho}$, $d^2u_{ortho}$, $du_{ortho-ADD}$, $du_{main}$, and $d^2u_{main}$. To determine "v" texture coordinate values, initial data values are received by the TVD circuit 600 for a set of six parameters including $v_{-main}$, $dv_{main}$, $d^2v_{main}$, $dv_{ortho}$, $d^2v_{ortho}$, and $dv_{ortho-ADD}$. The initial texture coordinates, $u(a_{0,0})$ and $v(a_{0,0})$, are equal to $u_{-main}$ and $v_{-main}$ respectively.

To determine "u" texture coordinate values using the TVD circuit 600, a set of six values are initially loaded into the TVD circuit 600 via the data input bus 614. An initial value, $u_{main}$, is loaded into the first input 609 of the first accumulator 608 via the data input bus 614. A value, $d^2u_{main}$, is loaded into the first latch 620 via the data input bus 614. A value, $du_{main}$, is loaded into the first input 629 of the second accumulator 628 via the data input bus 614. A value, $du_{ortho-ADD}$, is loaded into the second latch 644 via the data input bus 614. A value, $du_{ortho}$, is loaded into the first input 639 of the third accumulator 638 via the data input bus 614. A value, $d^2u_{ortho}$, is loaded into the third latch 648 via the data input bus 614. It is understood that a corresponding set of initial values including $v_{-main}$, $dv_{main}$, $d^2v_{main}$, $dv_{ortho}$, $d^2v_{ortho}$, and $dv_{ortho-ADD}$ can be loaded into another analogous TVD circuit 600 to determine "v" texture coordinate values.

Figure 7:
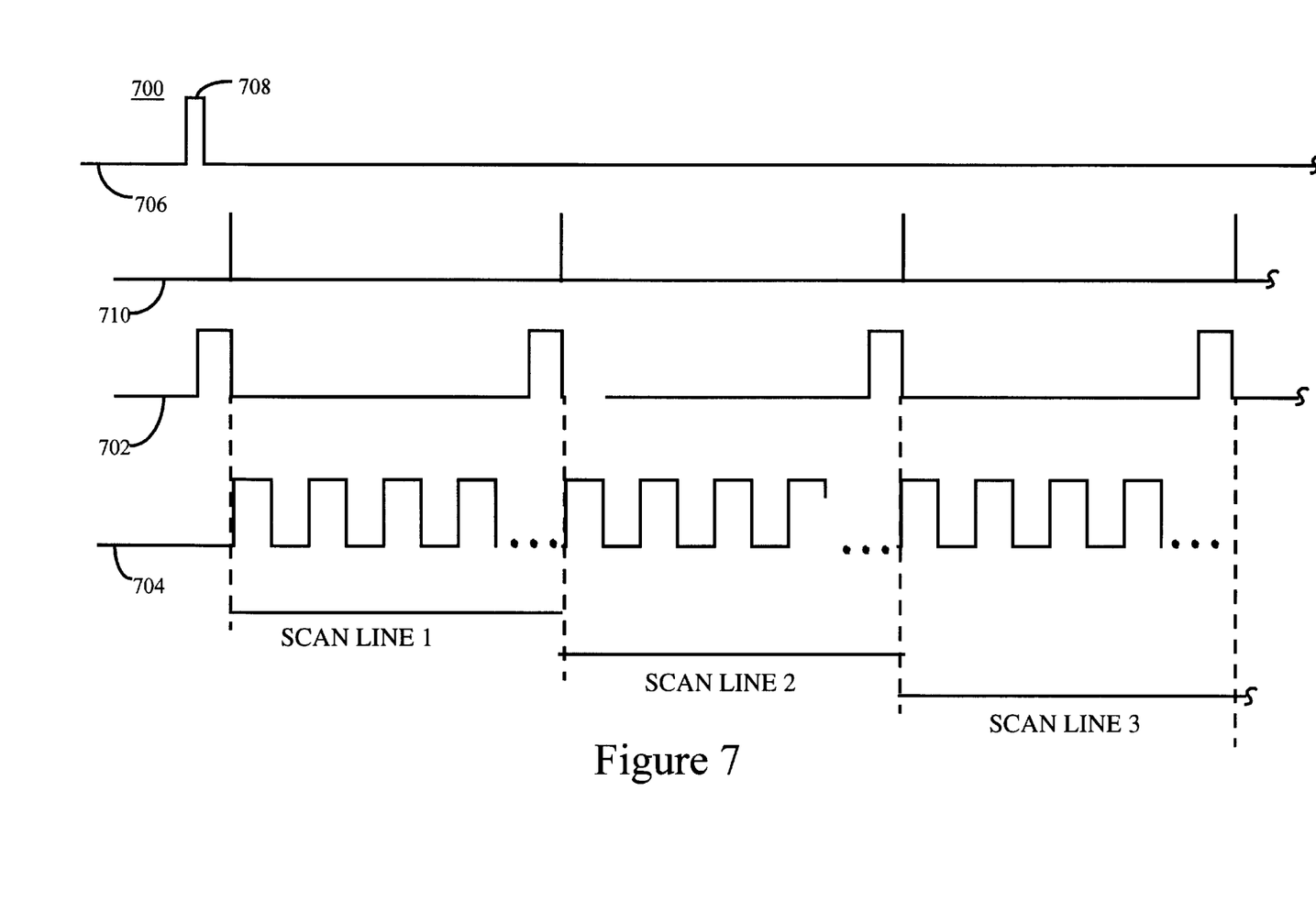
FIG. 7 is a timing diagram for operation of PN TVD circuit of the invention.

With reference to FIG. 7, a timing diagram 700 is shown for operation of the TVD circuit 600 of the present invention. Signal 702 represents the vertical slope walk clock signal (the n-clock) which is updated for each scan line. Signal 704 represents the orthogonal walk clock signal (the m-clock) which is updated for each pixel position within the scan line. Signal 706 represents an initial load main clock signal by which all initial values are latched-in from bus 614 in one embodiment. Signal 706 represents the start of an individual polygon rendering process. Time point 708 represents the point in time at which initial main values ($u_{-main}$, $du_{main}$, and $d^2u_{main}$) are loaded into the TVD circuit 600 of the present invention. Signal 710 represents an initial load ortho clock signal. Time point 712 represents the point in time at which initial ortho values ($dv_{ortho}$, $d^2v_{ortho}$, and $dv_{ortho-ADD}$) are loaded into the TVD circuit 600 of the present invention. In another embodiment, it is appreciated that the initial ortho values can also be loaded in synchronization with the clock 706 and clock 710 is eliminated.

With reference to FIG. 6, for m=0 and n>0, the value of the signal provided by the output 612 of the first accumulator 608 (which provides the output of the vertical walk subcircuit 602) is expressed according to relationship (5A), reprinted below.

$$u(a_{0,n}) = u(a_{0,\,n-1}) + du_{main} + (n-1)d^2u_{main} \text{ for m=0, n>0} \quad (5A)$$

The value, n, corresponds to the vertical slope walk clock signal 702 which provides clock cycles beginning with the cycle during which the initial values are loaded into the TVD circuit 600. The value, m, corresponds to the orthogonal walk clock signal 704 which provides clock cycles beginning after the initial n-clock cycle. For m=0 and n>0, the output 632 of the second accumulator 628 provides a value, $(du_{main}+(n-1)d^2u_{main})$. The second accumulator 628 receives and stores the value, $du_{main}$, via the data input bus 614 upon the initial n-clock cycle. The value stored in the second accumulator 628 is increased by the value, $d^2u_{main}$, upon each n-clock cycle after an initial n-clock cycle. Upon each n-clock cycle, the accumulated sum stored in the second accumulator 628 is provided to the input 604 of the first adder 603.

With reference to FIG. 6, for m=0 and n>0, the output 642 of the third accumulator 638 provides an output of value, $(n(du_{ortho\_ADD}) + du_{ortho})$. The third accumulator 638 receives and stores the initial value, $du_{ortho}$, upon the initial n-clock cycle. The value stored in the third accumulator 638 is increased by the latched initial value, $du_{ortho\_ADD}$, upon each n-clock cycle after the initial n-clock cycle. The value, $(n(du_{ortho\_ADD}) + du_{ortho})$, provided by the output 642 of the third accumulator 638 is provided to the orthogonal walk subcircuit 652 to determine texture values for orthogonally walked polygon coordinates. The third adder 633, third accumulator 638, second latch 644, and third latch 648 all provide values for determining texture values for orthogonally walked polygon coordinates. However, each of these elements is contained within the vertical walk subcircuit because each of these elements must receive the n-clock signal as these elements generate values in terms of the value, n.

For m>0, the value of the signal provided by the output 662 of the fourth accumulator 658 (which provides the output of the orthogonal walk subcircuit 652) is expressed according to relationship (9A), reprinted below, $$u(a_{m,n}) = u(a_{m-1,\,n}) + n(du_{ortho\_ADD}) + du_{ortho} + (m-1)d^2u_{ortho} \text{ for m}\geq(9A)$$

wherein the values, n and m, correspond respectively to the n-clock and m-clock. Upon an initial m-clock cycle, the first input 679 of the fifth accumulator 678 receives the value, $(n(du_{ortho\_ADD}) + du_{ortho})$, from the output 642 of the third accumulator 638. Upon each m-clock cycle thereafter, the fifth adder 673 provides a sum output to the second input 680 of the fifth accumulator 678. The output sum provided by the fifth adder 673 increases the value stored in the accumulator 678 by the latched initial value, $d^2u_{ortho}$. Upon each m-clock cycle, the accumulated sum stored in the fifth accumulator 678 is provided to the input 654 of the fourth adder 653.

With reference to FIG. 6, Table 1, below, shows values provided by outputs 612, 632, and 642 of accumulators 608, 628, and 638 of the vertical walk subcircuit 602. Upon each n-clock cycle, the accumulators 608, 628, and 638 of the vertical walk subcircuit 602, output the respective values stored therein.

TABLE 1

| | (vertical walk subcircuit values) | | | | | |
|---|---|---|---|---|---|---|
| Output | In General for: m = 0, n > 0 | n = 0, m = 0 | n = 1, m = 0 | n = 2, m = 0 | n = 3, m = 0 | n = 4, m = 0 |
| (612) | u(0, n) = u(0, n − 1) +du$_{main}$+ (n − 1)d$^2$u$_{main}$ | u(0, 0) | u(0, 1) = u(0, 0) + du$_{main}$ | u(0, 2) = u(0, 1) + du$_{main}$ + d$^2$u$_{main}$ | u(0, 3) = u(0,2) + du$_{main}$ + 2d$^2$u$_{main}$ | u(0, 4) = u(0, 3) + du$_{main}$ + 3d$^2$u$_{main}$ |
| (632) | du$_{main}$ + (n − 1)d$^2$u$_{main}$ | du$_{main}$ | du$_{main}$ | du$_{main}$ + d$^2$u$_{main}$ | du$_{main}$ + 2d$^2$u$_{main}$ | du$_{main}$ + 3d$^2$u$_{main}$ |
| (642) | du$_{ortho}$ + | du$_{ortho}$ | du$_{ortho}$ + | du$_{ortho}$ + | du$_{ortho}$ + | du$_{ortho}$ + |

TABLE 1-continued (vertical walk subcircuit values)

| $ndu_{ortho-ADD}$ | $du_{ortho-ADD}$ | $2du_{ortho-ADD}$ | $3du_{ortho-ADD}$ | $4du_{ortho-ADD}$ |
|---|---|---|---|---|

With reference to FIG. 6, at the end of an initial n-clock cycle, n=0 and the initial value, $u(a_{0,0})$, is stored in the first accumulator 608 and provided at the output 612 of the first accumulator 608 as shown in table 1. Also, the first latch 620 is latched to the initial value, $d^2u_{main}$, while the second latch 644 is latched to the initial value, $du_{ortho-ADD}$, and the third latch 648 is latched to the initial value, $d^2u_{ortho}$. Further the initial value, $du_{main}$, is stored in the second accumulator 628 and provided at the output 632 of the second accumulator 628 as shown in table 1. Further, the initial value, $du_{ortho}$, is stored in the third accumulator 638 and provided at the output 642 of the third accumulator 638 as shown in Table 1.

At the end of a second n-clock cycle, n=1 and the value, $u(a_{0,0})$, stored in the first accumulator 608, is increased by the initial value, $du_{main}$, via the increase signal provided by the output 606 of the first adder 603. The accumulated value, $(u(a_{0,0})+du_{main})$ is provided at the output 632 of the second accumulator 628 as shown in table 1. Also, at the end of the second n-clock cycle, the accumulated value, $du_{main}$, stored in the second accumulator 628, is not yet increased by the latched value, $d^2u_{main}$. Therefore, the value, $du_{main}$, is provided at the output 632 of the second accumulator 628 as shown in table 1. Further, the initial value, $du_{ortho}$, stored in the third accumulator 638 is increased by the latched value, $du_{ortho-ADD}$, via the increase signal provided by the output 636 of the third adder 633. The accumulated value, $(du_{ortho}+du_{ortho-ADD})$, is provided at the output 642 of the third accumulator 638 for n=1 as shown in Table 1. Table 1 also shows values provided by the outputs 612, 632, and 642 of accumulators 608, 628, and 638 of the vertical walk subcircuit 602 for ensuing n-clock cycles.

Table 2, below, shows values provided at the respective outputs 662 and 682 of the accumulators 658 and 678 of the orthogonal walk subcircuit 652 as a function of m-clock cycles, for n>0.

TABLE 2

(orthogonal walk subcircuit values)

| Output | In General for: m = 0, n > 0 | m = 0 n > 0 | m = 1 n > 0 | m = 2 n > 0 | m = 3 n > 0 | m = 4 n > 0 |
|---|---|---|---|---|---|---|
| (662) | u(m, n) = u(m − 1,n) + $du_{ortho}$ + $ndu_{ortho-ADD}$ + (m − 1)$d^2u_{ortho}$ | u(0,n) | u(1,n) = u(0,n) + $du_{ortho}$ + $ndu_{ortho-ADD}$ | u(2,n) = u(1,n) + $du_{ortho}$ + $ndu_{ortho-ADD}$ + $d^2u_{ortho}$ | u(3,n) = u(2,n) + $du_{ortho}$ + $ndu_{ortho-ADD}$ + $2d^2u_{ortho}$ | u(4,n) = u(3,n) + $du_{ortho}$ + $ndu_{ortho-ADD}$ + $3d^2u_{ortho}$ |
| (682) | $du_{ortho}$ + $ndu_{ortho-ADD}$ + (m − 1)$d^2u_{ortho}$ | 0 | $du_{ortho}$ + $du_{ortho-ADD}$ | $du_{ortho}$ + $ndu_{ortho-ADD}$ + $d^2u_{ortho}$ | $du_{ortho}$ + $ndu_{ortho-ADD}$ + $2d^2u_{ortho}$ | $du_{ortho}$ + $ndu_{ortho-ADD}$ + $3d^2u_{ortho}$ |

With reference to FIG. 6, during an initial m-clock cycle, m=0 and the value, $u(a_{0,n})$, according relationship (6A), reprinted below, is transmitted from the output 612 of the first accumulator 608 (of the vertical walk subcircuit 602) to the first input 659 of the fourth accumulator 658 via the bus 613.

$$u(a_{0,n}) = u(a_{0,n-1}) + du_{main} + (n-1)d^2u_{main} \text{ for } m=0, n>0 \quad (6A)$$

As shown in Table 2, after the initial m-clock cycle, the initial accumulated value, $u(a_{0,n})$, stored in the fourth accumulator 658 is provided at the output 662 of the fourth accumulator 658. Also upon the initial m-clock cycle, the first input 679 of the fifth accumulator 678 receives the value, $((n)du_{ortho-ADD}+du_{ortho})$, from the output 642 of the third accumulator 638 of the vertical walk subcircuit 602. Upon each m-clock cycle thereafter, the fifth adder 673 provides a sum output to the second input 680 of the fifth accumulator 678. The increase signal provided by the fifth adder 673 increases the value stored in the accumulator 678 by the latched initial value, $d^2u_{ortho}$. Table 2, above, shows the values provided by the outputs 662 and 682 of accumulators 658 and 678 of the vertical walk subcircuit 602 for ensuing m-clock cycles.

The preferred embodiment of the present invention, a circuit for a non-homogenous second order perspective texture mapping system using linear interpolation parameters, is thus described. While the present invention has been described in particular embodiments, it should be appreciated that the present invention should not be construed as limited by such embodiments, but rather construed according to the below claims.

What is claimed is:

1. A circuit for determining a texture mapped coordinate within a texture map stored in memory, said circuit operable during an image rendering process for a polygon, said circuit comprising a) a vertical walk subcircuit receiving a load signal and a vertical slope walk clock, said vertical walk subcircuit comprising:

a first circuit receiving a $du_{main}$ value and a $d^2u_{main}$ value and for generating a first output value of said $du_{main}$ value summed with a repetition of said $d^2u_{main}$ value, said repetition of said $d^2u_{main}$ value based on said vertical slope walk clock;

a second circuit receiving said output value from said first circuit and summing a value $u_{main}$ with said output value from said first circuit to generate an output of said second circuit; and a third circuit receiving a $du_{ortho-add}$ value and a $du_{ortho}$ value and for generating a second output value of said $du_{ortho}$ value summed with a repetition of said $du_{ortho-add}$ value, said repetition of said $du_{ortho-add}$ value based on said vertical slope walk clock; and b) an orthogonal walk subcircuit receiving said load signal and an orthogonal walk clock, said vertical walk subcircuit comprising:

a fourth circuit receiving a $d^2u_{ortho}$ value and said second output and for generating a third output value of said second output value summed with a repetition of said $d^2u_{ortho}$ value, said repetition of said $d^2u_{ortho}$ value based on said orthogonal walk clock; and a fifth circuit summing said first and said third output values to generate a fourth output value, wherein said fourth output value represents said texture mapped coordinate for a pixel of said polygon.

2. A circuit as described in claim 1 wherein said first circuit comprises a latch and an adder coupled together to function as an accumulator.

3. A circuit as described in claim 1 wherein said second circuit comprises a latch and an adder coupled together to function as an accumulator.

4. A circuit as described in claim 1 wherein said third circuit comprises a latch and an adder coupled together to function as an accumulator.

5. A circuit as described in claim 1 wherein said fourth circuit comprises a latch and an adder coupled together to function as an accumulator.

6. A circuit as described in claim 1 wherein said fifth circuit comprises a latch and an adder coupled together to function as an accumulator.

7. A circuit for determining values for texture coordinates, $u(a_{0,n})$ and $v(a_{0,n})$, for a non-homogenous second order perspective texture mapping system, said circuit comprising:

a first accumulator including a first input coupled to receive an initial value, $u(0,0)$, from a data input bus and a second input coupled to receive an output of a first adder wherein the first adder includes an input coupled to receive an output of a second accumulator and wherein an output of said first accumulator yields a value according to the relationship, $u(a_{0,n})=u(a_{0,\,n-1})+du_{main}+(n-1)*d^2u_{main}$ for m=0, n>0;

wherein said second accumulator including a first input coupled to receive an initial value, $du_{main}$, from said data input bus and a second input coupled to receive a signal from an output of a second adder wherein said second adder includes an input coupled to receive a latched initial value, $d^2u_{main}$, via said data input bus and wherein an output of said second accumulator yields a value according to the relationship, $du_{main}+(n-1)*d^2u_{main}$ for m=0, n>0, wherein said first accumulator and said second accumulator are clocked by a vertical slope walk clock signal.

8. A circuit for determining values texture coordinates, $u(a_{m,n})$ and $v(a_{m,n})$, for m>0, for a non-homogenous second order perspective texture mapping system, said circuit comprising:

a first accumulator clocked by a vertical slope walk clock, n, and including a first input coupled to receive an initial value, $du_{ortho}$, from a data input bus and a second input coupled to receive a signal from an output of a first adder wherein said first adder includes an input coupled to receive a latched initial value, $du_{ortho-ADD}$, via said data input bus and wherein an output of said first accumulator yields a value according to the relationship, $du_{ortho}+n(du_{ortho-ADD})$ for m=0, n>0;

a second accumulator clocked by an orthogonal walk clock, m, including a first input coupled to receive an initial value, $u(a_{0,\,n})$, said second accumulator also including a second input coupled to receive a signal from an output of a second adder wherein said second adder includes an input coupled to receive a signal from an output of a third accumulator and wherein an output of said second accumulator yields a value according to a relationship, $u(a_{m,n})=u(a_{m-1,\,n})+du_{ortho}+n(du_{ortho-ADD})+(m-1)d^2u_{ortho}$ for m>0;

said third accumulator clocked by said orthogonal walk clock and including a first input coupled to receive a signal from said output of said first accumulator and a second input coupled to receive a signal from an output of a third adder wherein said third adder includes an input coupled to receive a latched initial value, $d^2u_{ortho}$, via said data input bus and wherein an output of said third accumulator yields a value according to the relationship, $du_{ortho}+n(du_{ortho-ADD})+(m-1)d^2u_{ortho}$ for m>0.

9. The circuit of claim 8 wherein said first input of said second accumulator is coupled to receive said initial value, $u(a_{0,\,n})$, from a circuit output of a vertical slope walk sub-circuit comprising:

a fourth accumulator clocked by said vertical slope walk clock and including a first input coupled to receive an initial value, $u(0,0)$, from a data input bus and a second input coupled to receive a signal from an output of a fourth adder wherein the fourth adder includes an input coupled to receive an output of a fifth accumulator and wherein an output of said fourth accumulator provides said circuit output which yields a value according to the relationship, $u(a_{0,n})=u(a_{0,\,n-1})+du_{main}+(n-1)d^2u_{main}$ for m=0, n>0; and said fifth accumulator clocked by said vertical slope walk clock and including a first input coupled to receive an initial value, $du_{main}$, via said data input bus and a second input coupled to receive a signal from an output of a fifth adder wherein said fifth adder includes an input coupled to receive a latched initial value, $d^2u_{main}$, via said data input bus and wherein an output of said fifth accumulator yields a value, $du_{main}+(n-1)d^2u_{main}$ for m=0, n>0.

* * * * *